G. H. GARCELON AND C. A. M. WEBER.
SINGLE PHASE ALTERNATING CURRENT COMMUTATOR MOTOR.
APPLICATION FILED AUG. 11, 1917.
1,400,047.
Patented Dec. 13, 1921.
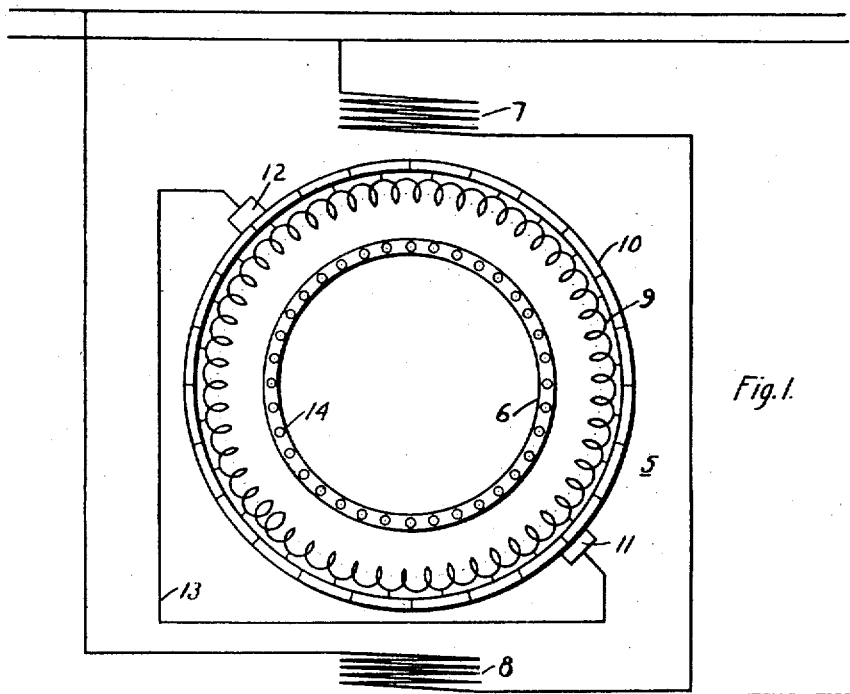
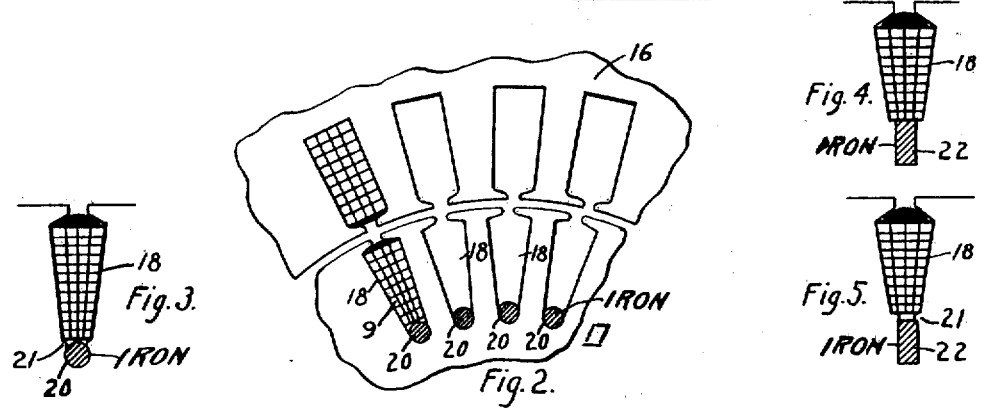
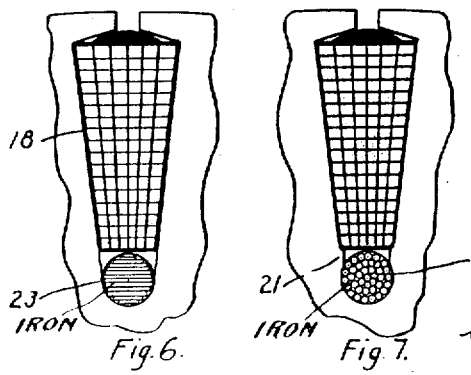
WITNESSES:
INVENTOR
George H. Garcelon &
Clifford A. M. Weber
BY
ATTORNEY

UNITED STATES PATENT OFFICE.

GEORGE H. GARCELON, OF SWISSVALE, AND CLIFFORD A. M. WEBER, OF EDGEWOOD PARK, PENNSYLVANIA, ASSIGNORS TO WESTINGHOUSE ELECTRIC & MANUFACTURING COMPANY, A CORPORATION OF PENNSYLVANIA.

SINGLE-PHASE ALTERNATING-CURRENT COMMUTATOR-MOTOR.

1,400,047.  Specification of Letters Patent.  Patented Dec. 13, 1921.

Application filed August 11, 1917. Serial No. 185,707.

*To all whom it may concern:*

Be it known that we, GEORGE H. GARCELON, a citizen of the United States, and a resident of Swissvale, in the county of Allegheny and State of Pennsylvania, and CLIFFORD A. M. WEBER, a citizen of the United States, and a resident of Edgewood Park, in the county of Allegheny and State of Pennsylvania, have invented a new and useful Improvement in Single-Phase Alternating-Current Commutator-Motors, of which the following is a specification.

Our invention relates to alternating-current motors of the single-phase commutator type and it has for its object to provide a motor of the character designated that may be started with a minimum of line disturbance and with ample torque, and which shall thereafter operate with substantially uniform speed, irrespective of the load, having a speed characteristic similar to that of the ordinary shunt motor.

In the accompanying drawing, Figure 1 is a diagrammatic view of a motor embodying our invention in a preferred form; Fig. 2 is a fragmentary sectional view of a portion of the motor shown in Fig. 1; and Figs. 3 to 7, inclusive, are fragmentary views similar to Fig. 2 and illustrating modified forms of our invention.

Single-phase alternating-current motors of the commutator type are widely used on account of their desirable starting characteristics, namely, high starting torque and low starting current. For constant-speed work it is customary to provide motors of this type with a governing device which short circuits the commutator in the running position or to employ an auxiliary set of brushes to limit the no-load speed.

Devices of this character are undesirable on account of complication and also are expensive in manufacture and subject to failure during operation.

In accordance with our invention, we employ a single-phase commutator machine having a stator winding of the usual type and having a rotor member provided with a commutated winding and, in addition thereto, a short-circuited or squirrel-cage winding of high inherent reactance. Said squirrel-cage winding is preferably closely associated with the commutated winding, as will hereinafter more fully appear.

Referring to the drawing, we show a motor at 5 in Fig. 1, said motor comprising an armature 6 and exciting field windings 7 and 8. The armature 6 is provided with a winding 9 similar to that of an ordinary direct-current machine, and said winding is connected to the segments of a commutator cylinder 10 in an appropriate manner. Brushes 11 and 12 bear upon the commutator cylinder 10 and are shown interconnected, as by a lead 13, for repulsion operation of the motor 5, the brushes 11 and 12 being appropriately disposed in an oblique axis with respect to the field windings 7 and 8.

While we have thus shown the motor 5 arranged for repulsion operation, this is merely for the purpose of illustration and we equally contemplate the series connection and operation of our motor, if desired. A squirrel-cage winding 14 is disposed adjacent the winding 9, as will be hereinafter more fully described. The windings 7 and 8 may be connected across suitable single-phase supply mains 15.

The specific arrangement of the windings 9 and 14 is shown in Fig. 2. The stator structure is shown at 16 and may be of any suitable form. The rotor structure is indicated at 17 and comprises a laminated core member provided with slots 18. Iron bars 20 are slipped in the bottoms of the slots 18. Said bars are suitably connected by end rings to constitute the squirrel-cage winding 14. The winding 9 is arranged in the upper portions of the slots 19, directly overlying the iron bars 20, said commutated winding 9 preferably being formed of copper.

Having thus described the structure of a motor involving our invention, the operation thereof is as follows: At starting, the high inherent reactance of the short circuited winding 14 limits the amount of current flowing in this winding; and, furthermore, said current being out of phase with the current in the commutated winding does not materially increase the total current drawn from the line. Furthermore, the current in the short-circuited winding being out of phase with the current in the commutated winding does not materially reduce the starting torque below the amount that would be obtained from the commutated winding alone.

Under running conditions at heavy loads, the short-circuited winding assists the commutated winding, raising the speed from the value it would otherwise have. As the load is decreased, the short-circuited winding becomes less and less effective until its normal no-load speed is reached. At lighter loads, corresponding to speeds between the no-load speed of the squirrel-cage winding and its synchronous speed, said short-circuited winding produces but little effect. For loads corresponding to a speed in excess of synchronous speed of the squirrel cage winding, said winding acts to regenerate energy and to return it to the system thus producing a pronounced breaking action. At no load, the speed of the motor rises until the motor torque developed by the commutated winding is balanced by the generator torque produced by the short-circuited winding, neglecting friction and windage.

By proper proportioning of the parts the no-load speed may be held at a point which gives the motor a substantially constant speed characteristic as is desirable in a wide range of industrial motor applications.

By the construction shown, it will be seen that a substantially constant speed motor is produced, wherein there is no switching mechanism to be operated in accordance with the speed or current of the motor.

A somewhat similar effect to the above may be produced by employing a squirrel-cage winding of high resistance, but large ohmic losses will be produced thereby and, furthermore, the currents in said winding will be more nearly in phase with the current in the commutated winding, thus seriously affecting the starting torque of the motor and unduly enhancing the total starting current thereof.

In order to insure sufficient reactance in the short-circuited winding, it is desirable not only that the bars 20 be formed of iron but also that the end rings shown in Fig. 1 be formed from magnetic material.

While, for best operation, the short-circuited winding should be mounted in close proximity to the commutated winding, as shown in Fig. 2, it is desirable, for convenience in construction, that the bars 20 be retained in position in the slots 18 independently of the commutated winding and, to this end, the size of the slots may be slightly restricted, as shown at 21 in Fig. 3, so that, by sliding the bars 20 into place, they may be retained in position.

Under certain conditions, we find it preferable to employ squirrel-cage bars of rectangular cross-section as shown at 22 in Figs. 4 and 5, the armature slot being shaped accordingly. In Fig. 4, the conductor 22 merely lies in the bottom of the slot; whereas, in Fig. 5, small retaining fingers 21 are provided in the laminations.

It is obvious that, if the squirrel-cage conductors are large in cross-section, serious hysteresis and eddy-current losses may occur therein and, to minimize this effect, the squirrel-cage conductors may be laminated, as shown in Figs. 6 and 7. In Fig. 6, the laminæ are in the form of transversely disposed plates, as shown at 23, said plates being preferably slightly insulated from each other as by oxidation or varnishing. The resultant squirrel-cage conductor is maintained in the bottom of the slot by the winding 18. In the structure of Fig. 7, the squirrel-cage conductor shown at 24 is in the form of a bundle of magnetic wire so as to be even more thoroughly laminated and said bundle of wire is retained by small flanges 21—21, as in certain other figures.

The squirrel-cage or short-circuited winding has been shown as having a bar or conducting element in each armature slot but it frequently happens that the number of slots occupied by the commutated winding is larger than is necessary or desirable for a successfully operable squirrel-cage or short-circuited winding. Under these conditions, we may provide an armature structure wherein a squirrel-cage bar is disposed, for example, in every third slot, thus effecting a material saving in the construction while maintaining the desired operating characteristics.

While we have shown our invention in a plurality of preferred forms, it will be obvious to those skilled in the art that it is susceptible of various minor changes and modifications without departing from the spirit thereof and we desire, therefore, that only such limitations shall be placed thereupon as are imposed by the prior art or as are specifically indicated in the appended claims.

We claim as our invention:

1. In a single-phase, alternating-current motor, the combination with a slotted armature core, of a squirrel-cage winding including conductors composed of magnetic material and lying in the bottom of the slots of said core, and a commutated winding immediately overlying said squirrel-cage winding.

2. The combination with a single-phase, alternating-current motor provided with a field winding, with a slotted armature and with a commutated winding lying in said slots, of a short-circuited winding of relatively high reactance as compared with its resistance underlying said commutated winding in certain of said slots, the reactance of said short-circuited winding being such as to cause the flux of said winding to be largely dephased with respect to the flux of said field winding, whereby the effectiveness of said commutated winding during starting conditions is only slightly impaired.

3. The combination with a single-phase, alternating-current motor provided with a slotted armature and with a commutated winding lying in said slots, of a short-circuited winding including solid conductors of magnetizable material underlying said commutated winding in certain of said slots.

4. A single-phase alternating-current motor of the commutator type comprising an auxiliary short-circuited armature winding including conductors composed entirely of magnetizable material disposed in immediate proximity to the commutated armature winding thereof.

5. The combination with a single-phase, alternating-current motor provided with a field winding, with a slotted armature and with a commutated winding lying in said slots, of a short-circuited winding of relatively high reactance, as compared with its resistance, disposed in immediate proximity to said commutated winding in certain of said slots, the reactance of said short-circuited winding being such as to cause the flux of said winding to be largely dephased with respect to the flux of said field winding, whereby the effectiveness of said commutated winding during starting conditions is only slightly impaired.

6. The combination with a single-phase, alternating-current motor provided with a slotted armature and with a commutated winding lying in said slots, of a short-circuited winding including solid conductors of magnetizable material disposed in immediate proximity to said commutated winding in certain of said slots.

7. The combination with a single-phase, alternating-current motor of the commutator type provided with a slotted armature and with a winding lying in said slots and connected to the commutator, of a closed-circuit winding of magnetizable material underlying said commutated winding in certain of said slots, the major portion of the working flux of said motor cutting said closed-circuit winding during the starting operation.

8. A single-phase alternating-current motor of the commutator type comprising an auxiliary closed-circuit armature winding of magnetizable material disposed in immediate proximity to the commutated armature winding thereof, the major portion of the working flux of said motor cutting said closed circuit winding during the starting operation.

9. A single-phase, repulsion motor provided with an armature member, including the combination with a commutated winding carried by said armature member, of a short-circuited winding of relatively high reactance, as compared with its resistance, carried by said armature member, the major portion of the working flux of said motor cutting said short-circuited winding during the starting operation, the reactance of said short-circuited winding being such as to cause the flux of said winding to be largely dephased with respect to said working flux, whereby the effectiveness of said commutated winding during starting conditions is only slightly impaired.

10. A single-phase, repulsion motor provided with an armature member, including the combination with a commutated winding carried by said armature member, of a short-circuited winding including conductors of magnetizable material carried by said armature member, the major portion of the working flux of said motor cutting said short-circuited winding during the starting operation.

11. An alternating-current, commutator motor provided with an armature member, including the combination with a commutated winding carried by said armature member, of a short-circuited winding of relatively high reactance, as compared with its resistance, carried by said armature member, the major portion of the working flux of said motor cutting said short-circuited winding during the starting operation, the reactance of said short-circuited winding being such as to cause the flux of said winding to be largely dephased with respect to said working flux, whereby the effectiveness of said commutated winding during starting conditions is only slightly impaired.

12. An alternating-current, commutator motor provided with an armature member, including the combination with a commutated winding carried by said armature member, of a short-circuited winding including conductors of magnetizable material carried by said armature member, the major portion of the working flux of said motor cutting said short-circuited winding during the starting operation.

In testimony whereof, we have hereunto subscribed our names this 31st day of July, 1917.

GEORGE H. GARCELON.
CLIFFORD A. M. WEBER.